United States Patent
Kim et al.

(10) Patent No.: US 9,414,369 B2
(45) Date of Patent: *Aug. 9, 2016

(54) METHOD AND APPARATUS FOR RELAYING DATA IN WIRELESS COMMUNICATION SYSTEM BASED ON TDD

(71) Applicant: LG Electronics Inc., Seoul (KR)

(72) Inventors: Byoung Hoon Kim, Anyang-si (KR); Yeong Hyeon Kwon, Anyang-si (KR); Han Byul Seo, Anyang-si (KR); Jae Hoon Chung, Anyang-si (KR); Young Woo Yun, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,236

(22) Filed: Feb. 5, 2015

(65) Prior Publication Data

US 2015/0156765 A1    Jun. 4, 2015

Related U.S. Application Data

(63) Continuation of application No. 13/128,539, filed as application No. PCT/KR2009/006383 on Nov. 2, 2009, now Pat. No. 9,271,277.

(60) Provisional application No. 61/113,229, filed on Nov. 11, 2008.

(30) Foreign Application Priority Data

Feb. 9, 2009  (KR) .................. 10-2009-0010020

(51) Int. Cl.
*H04J 3/00*  (2006.01)
*H04W 72/04*  (2009.01)
*H04B 7/155*  (2006.01)

(52) U.S. Cl.
CPC ........... *H04W 72/0413* (2013.01); *H04B 7/155* (2013.01); *H04J 3/00* (2013.01); *H04W 72/042* (2013.01)

(58) Field of Classification Search
CPC ........ H04B 7/14; H04B 7/155; H04W 72/042
USPC .......................................................... 370/279
See application file for complete search history.

(56) References Cited

U.S. PATENT DOCUMENTS 6,801,515 B1    10/2004  Ishikawa et al.
8,254,295 B2 *  8/2012   Choi ..................... H04L 5/0053
                                                      370/252

(Continued)

FOREIGN PATENT DOCUMENTS

KR    10-2007-0031173 A    3/2007

*Primary Examiner* — Asad Nawaz
*Assistant Examiner* — Syed S Ali
(74) *Attorney, Agent, or Firm* — Birch, Stewart, Kolasch & Birch, LLP

(57) ABSTRACT

A method and a wireless station are described for receiving signals. The wireless station receives from a base station configured to use at least one of a plurality of time division duplex (TDD) uplink-downlink (UL-DL) subframe configurations, each of which indicates locations of at least one DL subframe and at least one UL subframe in a radio frame, a signal including information indicating that at least one uplink subframe indicated by the at least one of the plurality of TDD UL-DL subframe configurations is reconfigured as a DL subframe. The wireless station receives, from the base station, DL data on the UL subframe according to the signal.

10 Claims, 13 Drawing Sheets

(56) References Cited

U.S. PATENT DOCUMENTS

| | | |
|---|---|---|
| 8,341,481 B2 | 12/2012 | Lee et al. |
| 2005/0123062 A1 | 6/2005 | Bassompierre et al. |
| 2005/0243745 A1 | 11/2005 | Stanwood et al. |
| 2007/0058595 A1 | 3/2007 | Classon et al. |
| 2007/0060050 A1 | 3/2007 | Lee et al. |
| 2007/0064669 A1 | 3/2007 | Classon et al. |
| 2007/0104223 A1 | 5/2007 | Lee et al. |
| 2007/0281613 A1* | 12/2007 | Lee ................ H04B 7/155 455/15 |
| 2008/0002658 A1* | 1/2008 | Soliman ................ 370/343 |
| 2008/0039011 A1* | 2/2008 | Chang ............... H04B 7/155 455/7 |
| 2008/0045144 A1 | 2/2008 | Fujita |
| 2008/0081626 A1 | 4/2008 | Choi et al. |
| 2008/0095195 A1 | 4/2008 | Ahmadi et al. |
| 2008/0137562 A1* | 6/2008 | Li .................. H04B 7/2656 370/280 |
| 2009/0129259 A1 | 5/2009 | Malladi et al. |
| 2009/0231989 A1 | 9/2009 | Larsson et al. |
| 2009/0257449 A1 | 10/2009 | Chen et al. |
| 2010/0041428 A1* | 2/2010 | Chen ................ H04W 52/16 455/522 |
| 2010/0061326 A1 | 3/2010 | Lee et al. |
| 2010/0080139 A1 | 4/2010 | Palanki et al. |
| 2010/0080166 A1 | 4/2010 | Palanki et al. |
| 2010/0103901 A1 | 4/2010 | Miki et al. |
| 2010/0118807 A1* | 5/2010 | Seo ................ H04W 72/042 370/329 |
| 2010/0120446 A1 | 5/2010 | Gaal |
| 2010/0246456 A1* | 9/2010 | Suo ................ H04W 56/003 370/280 |
| 2011/0013613 A1 | 1/2011 | Sung et al. |
| 2011/0216691 A1* | 9/2011 | Lim ................ H04B 7/155 370/315 |
| 2012/0184206 A1 | 7/2012 | Kim et al. |

* cited by examiner

METHOD AND APPARATUS FOR RELAYING DATA IN WIRELESS COMMUNICATION SYSTEM BASED ON TDD

CROSS REFERENCE TO RELATED APPLICATIONS

This application is a continuation of co-pending U.S. application Ser. No. 13/128,539 filed on May 10, 2011, which is the National Phase of PCT/KR2009/006383 filed on Nov. 2, 2009, which claims priority under 35 U.S.C. 119(e) to U.S. Provisional Application No. 61/113,229 filed on Nov. 11, 2008 and under 35 U.S.C. 119(a) to Patent Application No. 10-2009-0010020 filed in the Republic of Korea on Feb. 9, 2009, all of which are hereby expressly incorporated by reference into the present application.

BACKGROUND OF THE INVENTION

1. Field of the Invention

The present invention relates to wireless communication, and more particularly, to a method and an apparatus of relaying data in a wireless communication system based on Time Division Duplex (TDD).

2. Discussion of the Related Art

Methods for wireless communication systems may be chiefly classified into a TDD method and a Frequency Division Duplex (FDD) method. In accordance with the FDD method, uplink transmission and downlink transmission are carried out with them occupying different frequency bands. In accordance with the TDD method, uplink transmission and downlink transmission are carried out with them occupying the same frequency band at different times. The channel response of the TDD method is substantially reciprocal. It means that a downlink channel response and an uplink channel response are almost identical with each other in a certain frequency domain. Accordingly, there is an advantage in that in a wireless communication system based on TDD, the downlink channel response can be obtained from the uplink channel response.

In the TDD method, downlink transmission by a base station (BS) and uplink transmission by a mobile station (MS) cannot be performed at the same time because all the frequency bands are time-divided for uplink transmission and downlink transmission. In a TDD system in which uplink transmission and downlink transmission are classified on a subframe basis, uplink transmission and downlink transmission are carried out at different subframes.

Recently, wireless communication systems including a relay station (RS) are being developed. The relay station functions to expand the cell coverage and improve transmission performance. There is an advantage in that the cell coverage can be expanded because a base station provides service to a mobile station placed at the coverage edge of a base station via the relay station. Further, the transmission capacity can be increased because the relay station improves transmission reliability of a signal between the base station and the mobile station. In the case where a mobile station is placed within the coverage of a base station, but placed in a shadow region, a relay station may be used.

The relay station is difficult to send data to a mobile station while receiving data from a base station. Further, the relay station is difficult to send data to a base station while receiving data from a mobile station. This is because a signal outputted from the transmission stage of the relay station may interfere with a signal that should be received by the relay station under the influence of self-interference, distorting the signal.

In the wireless communication system based on TDD, uplink transmission and downlink transmission cannot be performed at the same time. Accordingly, the wireless communication system based on TDD can have lower resource efficiency in the time domain than a wireless communication system based on FDD. Furthermore, if a relay station is used in the wireless communication system based on TDD, radio resources must be allocated to the relay station. As described above, the relay station cannot perform the reception of data from a base station and the transmission of data to a mobile station (or the transmission of data to the base station and the reception of data to the mobile station) at the same time. Thus, the efficiency of resource allocation in the TDD system can be further lowered.

Accordingly, there is a need for a method of a relay station efficiently relaying data in a wireless communication system based on TDD.

SUMMARY OF THE INVENTION

Accordingly, the present invention has been made in view of the above problems, and it is an object of the present invention to provide a method and an apparatus of relaying data in a wireless communication system based on TDD.

In an aspect, a method of relaying data in a wireless communication system based on Time Division Duplex (TDD) using a radio frame comprising a plurality of subframes, the plurality of subframes comprising at least one downlink subframe and at least one uplink subframe is provided. The method includes receiving downlink data from a base station in an uplink subframe, and relaying the downlink data to at least one mobile station. The method may further include receiving uplink data from a mobile station in the uplink subframe. Resources used by the base station to transmit the downlink data in the uplink subframe and resources used by the mobile station to transmit the uplink data may not overlap with each other. The resources may be subject to time division or frequency division. The method may further include receiving information about the uplink subframe in which the downlink data is received. The method may further include selecting the uplink subframe in which the downlink data is received among the plurality of uplink subframes. The radio frame may comprise 10 subframes.

In another aspect, a relay station in a wireless communication system based on TDD using a radio frame comprising a plurality of subframes, the plurality of subframes comprising at least one downlink subframe and at least one uplink subframe is provided. The relay station includes a transceiver configured to transmit or receive a radio signal, and a processor coupled to the transceiver and configured to process downlink data received from a base station and relay the downlink data to a mobile station, wherein the processor receives the downlink data from the base station in at least any one of the uplink subframes included in the radio frame.

In a wireless communication system based on TDD in which uplink transmission and downlink transmission are carried out on a subframe basis, data can be relayed without additional resource allocation for a relay station. Accordingly, efficiency of resource allocation can be increased. Further, in a wireless communication system based on TDD, a new resource allocation is proposed for the operation of a relay station.

SUMMARY OF THE INVENTION

Wideband Code Division Multiple Access (WCDMA) can be implemented using radio technologies, such as Universal Terrestrial Radio Access Network (UTRAN) according to the 3GPP standards. CDMA2000 is CDMA-based radio technology. High Rate Packet Data (HRPD) in accordance with 3GPP2 standards provides high packet data services in CDMA2000-based systems. Evolved HRPD (eHRPD) is the evolution of HRPD. Time Division Multiple Access (TDMA) can be implemented using radio technologies, such as Global System for Mobile communications (GSM), General Packet Radio Service (GPRS), and Enhanced Data rates for GSM Evolution (EDGE). Orthogonal Frequency Division Multiple Access (OFDMA) can be implemented using radio technologies, such as IEEE 802.11 (Wi-Fi), IEEE 802.16 (WiMAX), IEEE 802-20, and Evolved-UTRAN (E-UTRAN). Long Term Evolution (LTE) is part of Evolved-UMTS (E-UMTS) using E-UTRAN. LTE adopts OFDMA in the downlink and adopts Single Carrier FDMA (SC-FDMA) in the uplink. LTE-Advanced (LTE-A) is the evolution of LTE.

Although 3GPP LTE and LTE-A are chiefly described in order to clarify a description, the technical spirit of the present invention is not limited to the 3GPP LTE/LTE-A.

Figure 1:
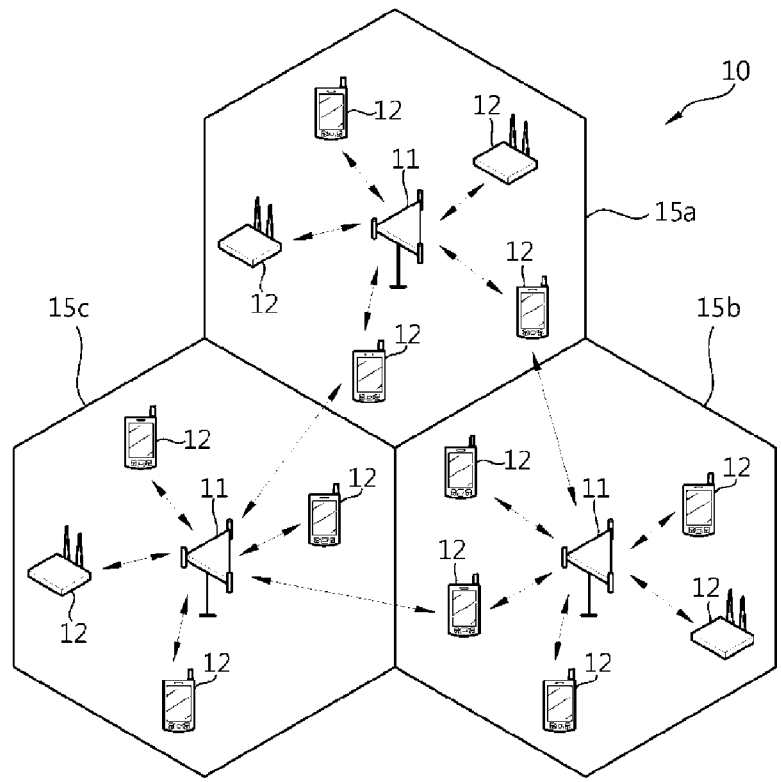
FIG. 1 is a diagram showing a wireless communication system.

FIG. 1 shows a wireless communication system. The wireless communication system 10 includes at least one base station (BS) 11. The base stations 11 provide communication services to respective geographical areas (in general called 'cells') 15a, 15b, and 15c. Each of the cells can be subdivided into a number of areas (called 'sectors'). One or more cells can exist in a single base station.

A mobile station (MS) 12 can be fixed or mobile and can be referred to as another terminology, such as a User Equipment (UE), a User Terminal (UT), a Subscriber Station (SS), a wireless device, a Personal Digital Assistant (PDA), a wireless modem, a handheld device, or an Access Terminal (AT). In general, the base station 11 refers to a fixed station which communicates with the mobile station 12. The base station 11 can be referred to as another terminology, such as an evolved-NodeB (eNB), a Base Transceiver System (BTS), an access point, or an Access Network (AN).

Hereinafter, downlink (DL) refers to communication from a BS to an UE, and uplink (UL) refers to communication from a mobile station to a base station. In the downlink, a transmitter can be part of a base station and a receiver may be part of a mobile station. In the uplink, a transmitter can be part of a mobile station and a receiver can be part of a base station.

Figure 2:
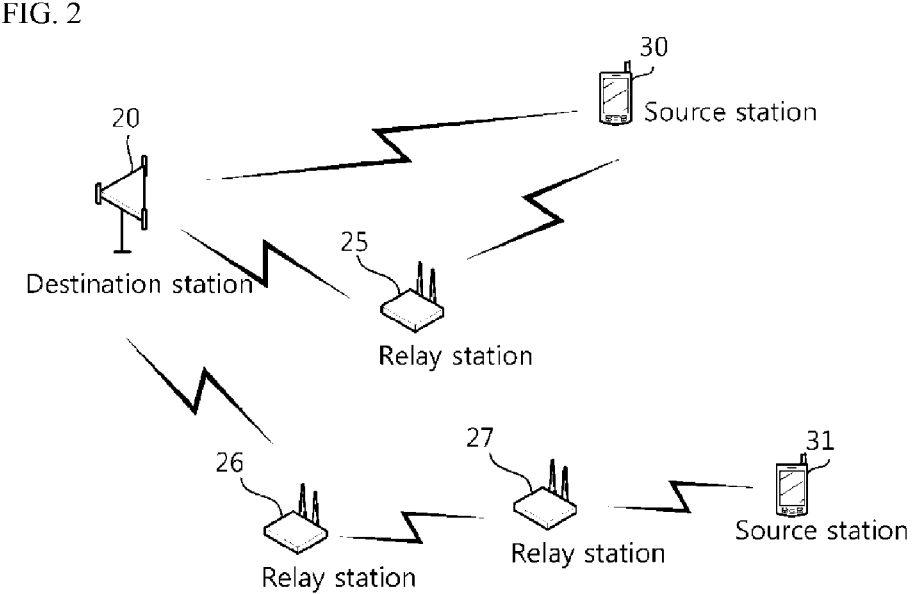
FIG. 2 is a diagram showing a wireless communication system using relay stations.

FIG. 2 shows a wireless communication system using relay stations. In uplink transmission, a source station can be a mobile station, and a destination station can be a base station. In downlink transmission, a source station can be a base station and a destination station can be a mobile station. A relay station may be a mobile station, and an additional relay station can be deployed. A base station can perform functions, such as connectivity, management, control, and resource allocation between a relay station and a mobile station.

Referring to FIG. 2, a destination station 20 communicates with a source station 30 via a relay station 25. In uplink transmission, the source station 30 transmits uplink data to the destination station 20 and the relay station 25, and the relay station 25 transmits the received data again. Further, the destination station 20 communicates with a source station 31 via relay stations 26 and 27. In uplink transmission, the source station 31 transmits uplink data to the destination station 20 and the relay stations 26 and 27, and the relay stations 26 and 27 transmit the received data again sequentially or at the same time.

Although one destination station 20, three relay stations 25, 26, and 27, and two source stations 30 and 31 are illustrated, the technical spirit of the present invention is not limited to the above example. It is to be noted that the number of destination stations, relay stations and source stations included in a wireless communication system is not limited.

Any method, such as Amplify and Forward (AF) and Decode and Forward (DF), can be used as a relay method for a relay station. The technical spirit of the present invention is not limited to the methods.

Figure 3:
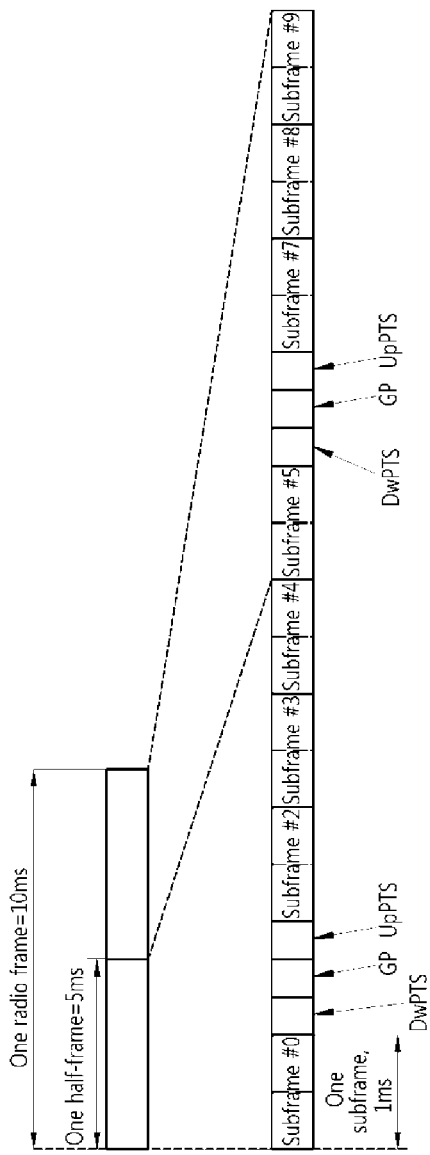
FIG. 3 is a diagram showing a TDD radio frame structure in a 3rd Generation Partnership Project (3GPP) Long Term Evolution (LTE) system.

FIG. 3 shows a TDD radio frame structure in the 3GPP LTE system. For the TDD radio frame structure, reference can be made to Paragraph 4.2 of 3GPP TS 36.211 V8.2.0 (2008-03) "Technical Specification Group Radio Access Network; Evolved Universal Terrestrial Radio Access (E-UTRA); Physical Channels and Modulation (Release 8)". A single radio frame is 10 ms in length and is composed of two half-frames each having a length of 5 ms. Further, a single half-frame is composed of five subframes each having a length of 1 ms. One subframe is designated as any one of an uplink (UL) subframe, a downlink (DL) subframe, and a special subframe. One radio frame includes at least one uplink subframe and at least one downlink subframe.

The special subframe is a specific period for separating the uplink and the downlink between an uplink subframe and a downlink subframe. At least one special subframe exists in one radio frame. The special subframe includes a Downlink Pilot Time Slot (DwPTS), a Guard Period (GP), and Uplink Pilot Time Slot (UpPTS). The DwPTS is used for initial cell search, synchronization, or channel estimation. The UpPTS is used for channel estimation in a base station and is used for upward transmission synchronization in a mobile station. The GP is a guard interval for removing interference that occurs in the uplink because of the multi-path delay of a downlink signal between the uplink and the downlink.

Table 1 below shows the structure of frames that can be set according to the deployment of uplink subframes and downlink subframes in the 3GPP LTE TDD system. In this table, 'D' denotes the downlink subframe, 'U' denotes the uplink subframe, and 'S' denotes the special subframe.

TABLE 1

| UPLINK-DOWNLINK CONFIGURATION | DOWNLINK-TO-UPLINK SWITCHING-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table, each of the uplink-downlink configurations 0 to 2 or 6 has a switching point period of 5 ms and is a configuration in which the uplink and the downlink are switched. Each of the uplink-downlink configurations 3 to 5 has a switching point period of 10 ms and is a configuration in which the uplink and the downlink are switched.

Figure 4:
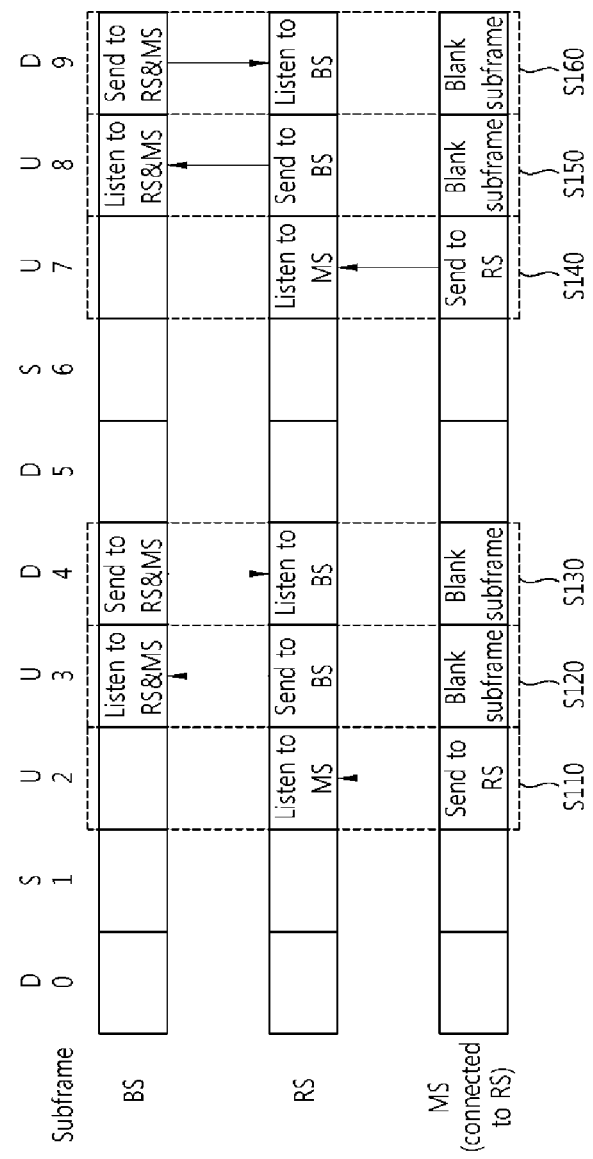
FIG. 4 is a diagram showing an example of data relay among a base station, a relay station, and a mobile station in the uplink-downlink configuration 1 of Table 1.

FIG. 4 is a diagram showing an example of data relay among a base station, a relay station, and a mobile station in the uplink-downlink configuration 1 of Table 1. At step S110, in an uplink subframe #2, a relay station receives data transmitted by a mobile station. At step S120, in an uplink subframe #3, the relay station relays the data to a base station. At this time, the relay station cannot receive data transmitted by the mobile station. Accordingly, the uplink subframe #3 becomes a blank subframe from a viewpoint of the mobile station. The blank subframe refers to a subframe to or from which any data is not transmitted or received. The base station (or relay station) can designate at least one of uplink subframes as a blank subframe using a method of not performing uplink scheduling for the mobile station. Alternatively, the relay station may designate at least one of downlink subframes as a blank subframe using a method of previously informing the mobile station that any transmission will not be performed in a corresponding subframe. When the mobile station has the blank subframe, the relay station can communicate with the base station without interference of the mobile station.

At step S130, in a downlink subframe #4, the relay station receives data transmitted by the base station. At this time, the relay station cannot transmit data to the mobile station connected to the relay station. The downlink subframe #4 becomes a blank subframe from a viewpoint of the mobile station.

Since the uplink-downlink configuration 1 has the switching point period of 5 ms, subframes #5 to #9 have the same shape as the respective subframes #0 to #4. Accordingly, at step S140, in the uplink subframe #7, the relay station receives data transmitted by the mobile station. At step S150, in the uplink subframe #8, the relay station relays the data to the base station. The uplink subframe #8 becomes a blank subframe from a viewpoint of the mobile station. At step S160, in the downlink subframe #9, the relay station receives data transmitted by the base station. The downlink subframe #9 becomes a blank subframe from a viewpoint of the mobile station.

In the case where a relay station and a base station transmit or receive data using a blank subframe, a problem arises in terms of efficiency. Any data is not transmitted or received in the blank subframe. Thus, when a mobile station has a blank subframe, the mobile station is in a standby state in which any data is not transmitted or received. This may cause transmission delay or reduce a transmission capacity. Further, a change in the traffic between the base station and the relay station may not be rapidly dealt with because the uplink-downlink configuration of a blank subframe is rarely changed.

Figure 5:
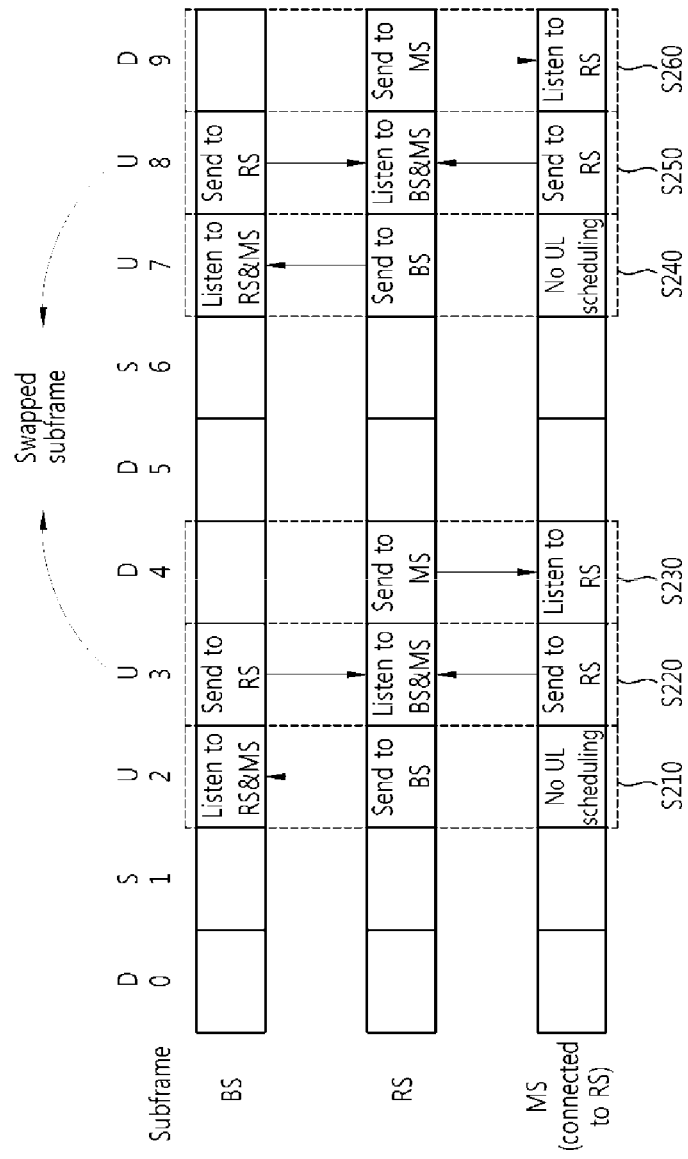
FIG. 5 is a diagram showing a data relay method according to an embodiment of the present invention.

FIG. 5 is a diagram showing a data relay method according to an embodiment of the present invention. A proposed structure adopts a swapped subframe in order to increase the efficiency of resource allocation. In an original TDD uplink-downlink configuration, a base station designates the swapped subframe as an uplink subframe for uplink transmission to a mobile station. However, at least one of uplink subframes is designated as the swapped subframe through dynamic allocation or static allocation, and a base station uses the swapped subframe to transmit data to a relay station. The base station may use part of or all of the swapped subframe to transmit data to the relay station. The swapped subframe is named in that an original use of an uplink subframe is swapped and may also be referred to as a stolen subframe.

At step S210, in an uplink subframe #2, a relay station transmits data to a base station. At this time, the relay station cannot receive data transmitted by mobile stations. This can be implemented in such a manner that the relay station does not perform uplink scheduling for the mobile stations. At step S220, in an uplink subframe #3, the relay station receives data transmitted by the mobile stations according to an original uplink-downlink configuration. At the same time, the relay station receives data transmitted by the base station. In this case, an uplink subframe becomes a swapped subframe. In the uplink subframe #3 (i.e., swapped subframe), the relay station receives data from the mobile stations and the base station at the same time. The data received from the mobile stations and the data received from the base station may differ. The data received from the mobile stations and the data received from the base station can be transmitted through different resources.

At step S230, in a downlink subframe #4, the relay station relays the data, received from the base station, to the mobile stations.

In a similar way, at step S240, in an uplink subframe #7, the relay station transmits data to the base station. At step S250, an uplink subframe #8 becomes a swapped subframe, and the relay station receives uplink data from the mobile stations and downlink data from the base station. At step S260, in a downlink subframe #9, the relay station relays the downlink data to the mobile stations.

As described above, in an uplink subframe (i.e., swapped subframe), the relay station receives downlink data from the base station. The downlink data is relayed to the mobile stations in a next downlink subframe. Accordingly, a blank subframe need not to be specially designated, and the efficiency of resource allocation can be improved. Furthermore, transmission delay resulting from blank subframes can be prevented.

Although the uplink subframes #3 and #8 of the uplink subframes are illustrated to be the swapped subframes in FIG. 5, the technical spirit of the present invention is not limited to the above example. For example, the position or number of uplink subframes used as swapped subframes can be fixed or changed. The position or number of uplink subframes exchanged with swapped subframes may be determined between a base station and a relay station prior to the actual data transmission. Further, a base station may inform a relay station of information about an uplink subframe exchanged with a swapped subframe. A base station may inform a relay station of information about a swapped subframe in the form of part of an RRC message, L1/L2 signaling, and system information.

Figure 6:
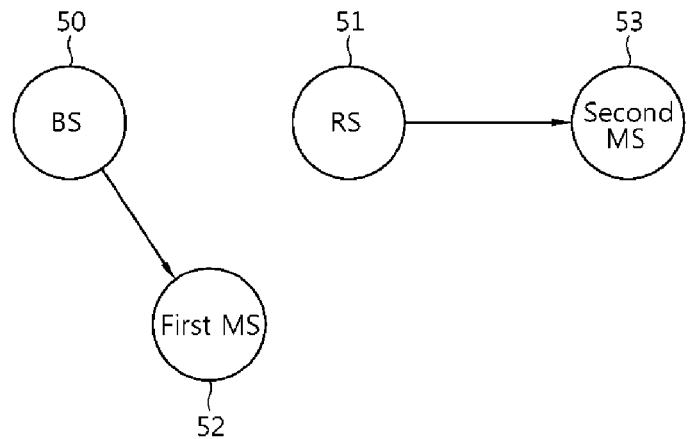
FIG. 6 is a diagram showing the transmission of data in a downlink subframe.

FIG. 6 shows the transmission of data in a downlink subframe. A base station 50 transmits first data to a first mobile station 52, and a relay station 51 relays second data to a second mobile station 53.

Figure 7:
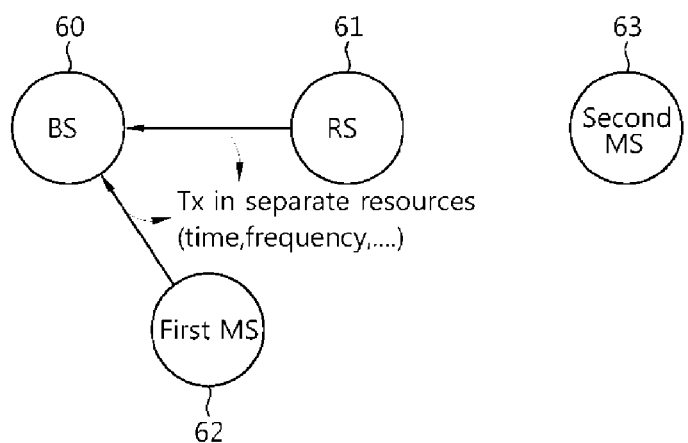
FIG. 7 is a diagram showing an example of the transmission of data in an uplink subframe.

FIG. 7 is a diagram showing an example of the transmission of data in an uplink subframe. A base station 60 receives first data transmitted by a first mobile station 62. A relay station 61 relays second data to the base station 60. At this time, a second mobile station 63 is not allowed to transmit data to the relay station 61. This can be implemented in such a manner that the base station 60 (or the relay station 61) does not perform uplink scheduling for the second mobile station 63 in a corresponding subframe. Meanwhile, the data transmitted by the relay station 61 and the data transmitted by the first mobile station 62 can use at least any one of different resources (e.g., different frequencies, different codes, and different times).

Figure 8:
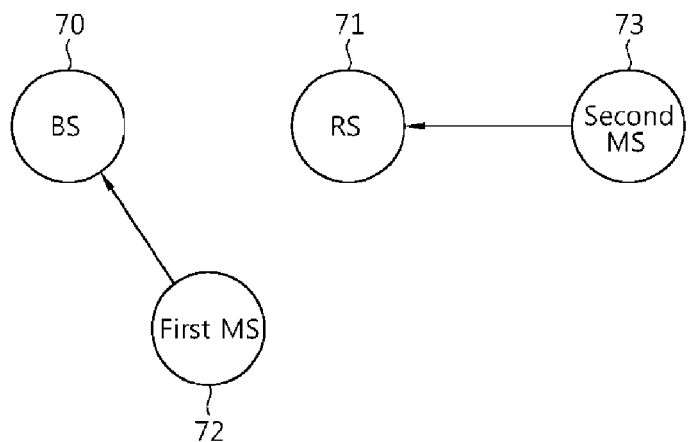
FIG. 8 is a diagram showing another example of the transmission of data in an uplink subframe.

FIG. 8 is a diagram showing another example of the transmission of data in an uplink subframe. A base station 70 receives first data from a first mobile station 72. A relay station 71 receives second data transmitted by a second mobile station 73.

Figure 9:
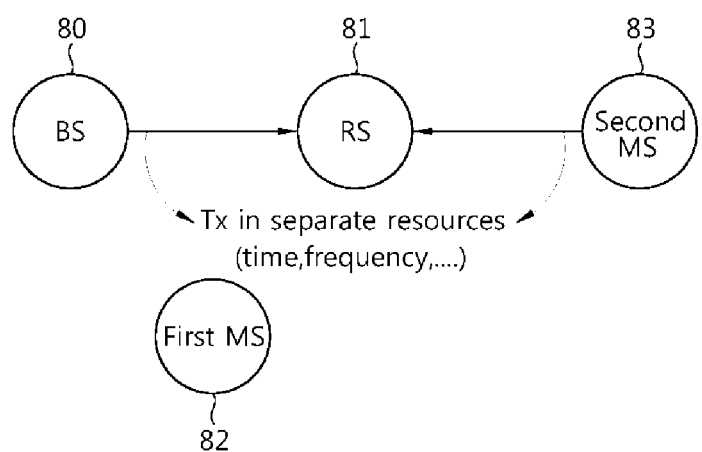
FIG. 9 is a diagram showing the transmission of data in a swapped subframe.

FIG. 9 is a diagram showing the transmission of data in a swapped subframe. A relay station 81 receives first data transmitted by a second mobile station 83 and at the same time receives second data transmitted by a base station 80. At this time, the second mobile station 83 can transmit the first data using resources (e.g., time division, code division, and frequency division) which do not overlap with resources that are used by the base station 80 to transmit the second data to the relay station 81. The base station 80 does not receive a signal transmitted by a first mobile station 82. This can be implemented in such a manner that the base station 80 does not perform uplink scheduling for the first mobile station 82 in a corresponding subframe.

In order to more effectively use a swapped subframe, a base station can control its transmission power when transmitting data to a relay station in the swapped subframe. In general, the transmission power of a base station is much stronger than the transmission power of a mobile station. Thus, if the transmission power is not controlled, data transmitted from the mobile station to a relay station can be subject to severe interference due to the transmission power of the base station.

Figure 10:
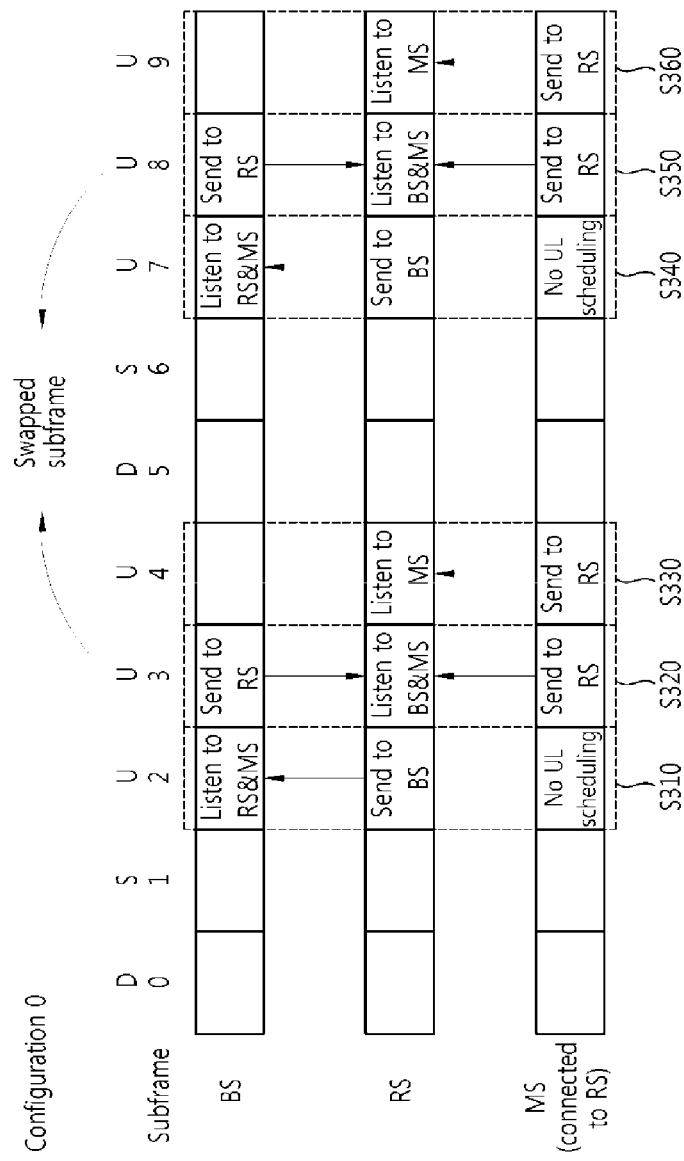
FIG. 10 is a diagram showing the data relay method according to the embodiment of the present invention in the uplink-downlink configuration 0.

FIG. 10 is a diagram showing the data relay method according to the embodiment of the present invention in the uplink-downlink configuration 0. At step S310, in an uplink subframe #2, a relay station transmits data to a base station. At this time, the relay station cannot receive data transmitted by mobile stations. This can be implemented in such a manner that the relay station does not perform uplink scheduling for the mobile stations.

At step S320, in an uplink subframe #3 (i.e., a swapped subframe), the relay station receive uplink data from the mobile stations and downlink data from the base station. The uplink data and the downlink data can be received through different resources.

At step S330, in an uplink subframe #4, the relay station receives data transmitted by the mobile stations.

At step S340, in an uplink subframe #7, the relay station transmits data to the base station. At step S350, in an uplink subframe #8 (i.e., a swapped subframe), the relay station receives data transmitted by the mobile stations and at the same time receives data transmitted by the base station. At step S360, in an uplink subframe #9, the relay station receives data transmitted by the mobile station.

Figure 11:
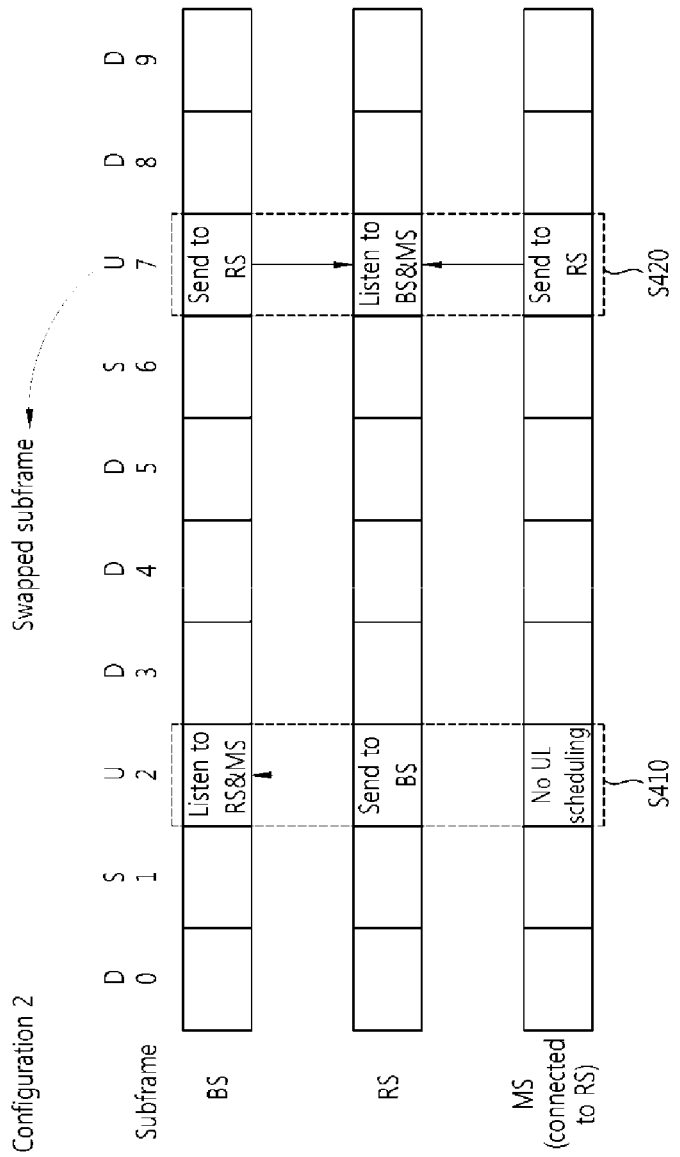
FIG. 11 is a diagram showing the data relay method according to the embodiment of the present invention in the uplink-downlink configuration 2.

FIG. 11 is a diagram showing the data relay method according to the embodiment of the present invention in the uplink-downlink configuration 2. At step S410, in an uplink subframe #2, a relay station transmits data to a base station. At this time, the relay station cannot receive data transmitted by mobile stations. This can be implemented in such a manner that the relay station does not perform uplink scheduling for the mobile stations.

At step S420, in an uplink subframe #7 (i.e., a swapped subframe), the relay station receives uplink data from the mobile stations and downlink data from the base station. The uplink data and the downlink data can be received through different resources.

Figure 12:
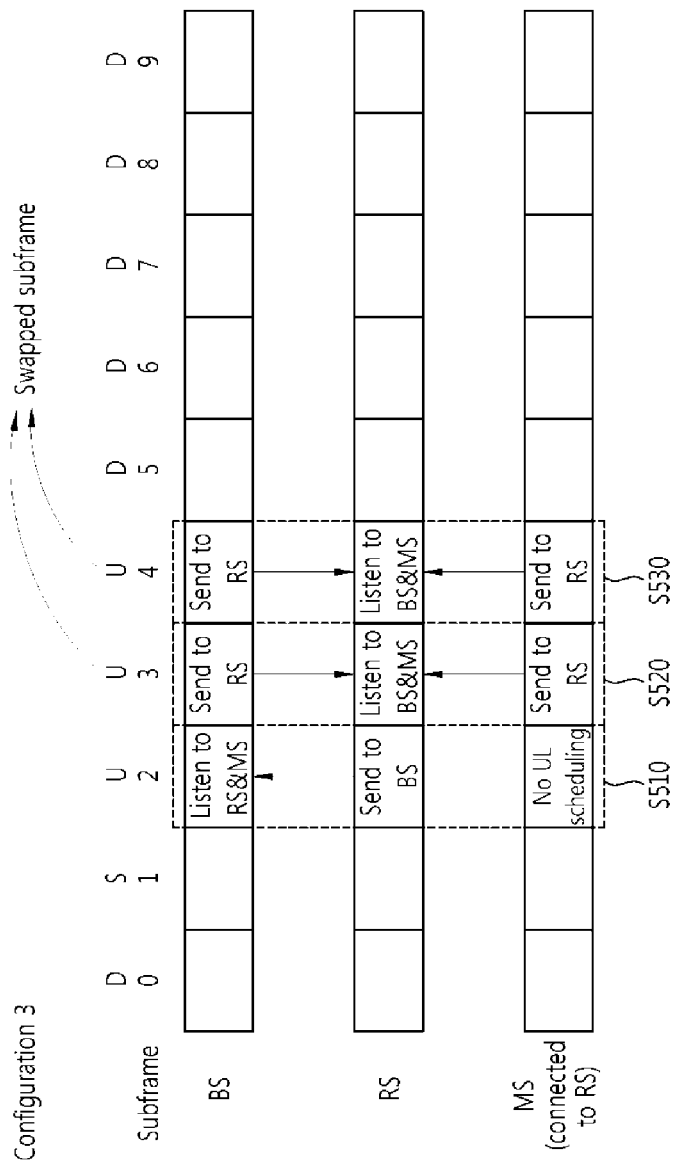
FIG. 12 is a diagram showing the data relay method according to the embodiment of the present invention in the uplink-downlink configuration 3.

FIG. 12 is a diagram showing the data relay method according to the embodiment of the present invention in the uplink-downlink configuration 3. At step S510, in an uplink subframe #2, a relay station transmits data to a base station. At this time, the relay station cannot receive data transmitted by mobile stations. This can be implemented in such a manner that the relay station does not perform uplink scheduling for the mobile stations.

At step S520, in an uplink subframe #3 (i.e., a swapped subframe), the relay station receives uplink data from the mobile stations and downlink data from the base station. The uplink data and the downlink data can be received through different resources. At step S530, in an uplink subframe #4 (i.e., a swapped subframe), the relay station receives uplink data from the mobile stations and downlink data from the base station. This method illustrates that two consecutive swapped subframes may exist in one radio frame.

Figure 13:
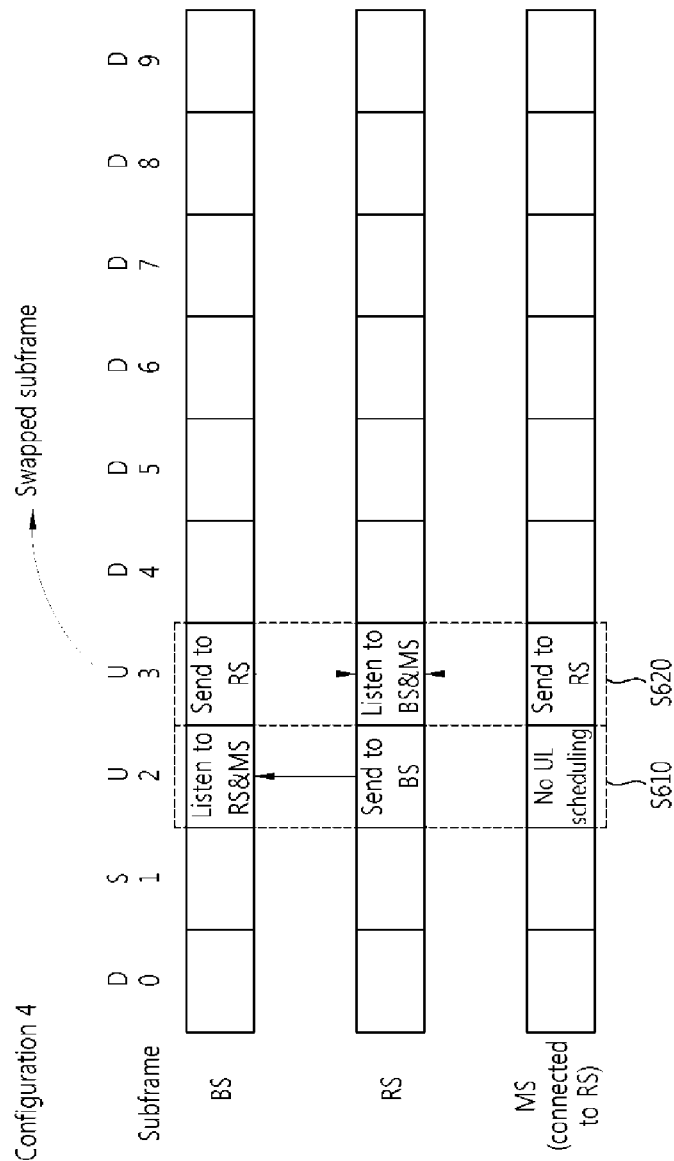
FIG. 13 is a diagram showing the data relay method according to the embodiment of the present invention in the uplink-downlink configuration 4.

FIG. 13 is a diagram showing the data relay method according to the embodiment of the present invention in the uplink-downlink configuration 4. At step S610, in an uplink subframe #2, a relay station transmits data to a base station. At this time, the relay station cannot receive data transmitted by mobile stations. This can be implemented in such a manner that the relay station does not perform uplink scheduling for the mobile stations.

At step S620, in an uplink subframe #3 (i.e., a swapped subframe), the relay station receives uplink data from the mobile stations and downlink data from the base station. The uplink data and the downlink data can be received through different resources.

Figure 14:
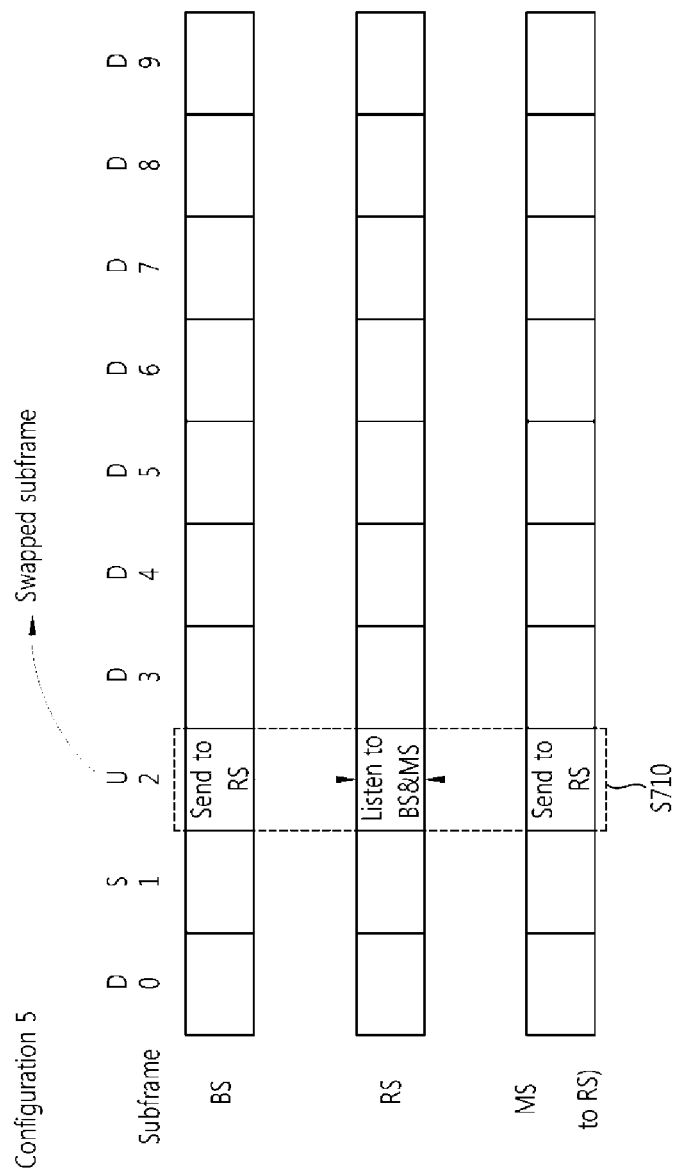
FIG. 14 is a diagram showing the data relay method according to the embodiment of the present invention in the uplink-downlink configuration 5.

FIG. 14 is a diagram showing the data relay method according to the embodiment of the present invention in the uplink-downlink configuration 5. At step S710, in an uplink subframe #2 (i.e., a swapped subframe), a relay station receives uplink data from mobile stations and downlink data from a base station. The uplink data and the downlink data can be received through different resources. In the uplink-downlink configuration 5, the uplink transmission of the mobile station can be performed by dynamically setting the uplink subframe of a previous or next radio frame as a swapped subframe because an opportunity for the uplink transmission is fewer than that in other uplink-downlink configurations.

Figure 15:
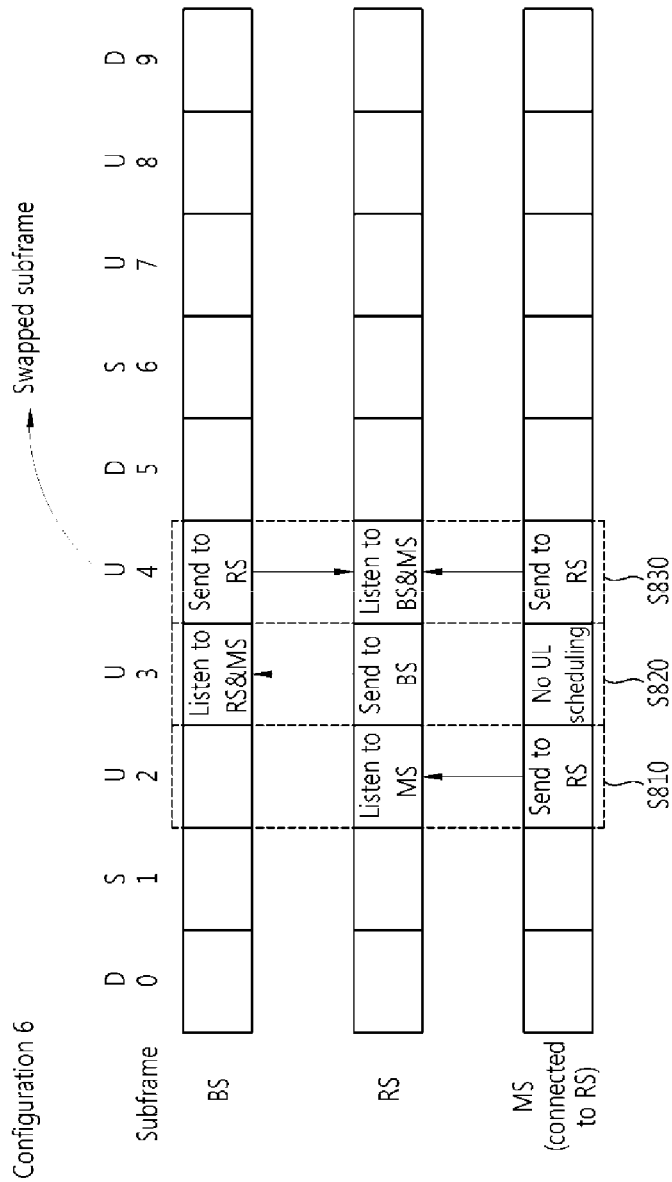
FIG. 15 is a diagram showing the data relay method according to the embodiment of the present invention in the uplink-downlink configuration 6.

FIG. 15 is a diagram showing the data relay method according to the embodiment of the present invention in the uplink-downlink configuration 6. At step S810, in an uplink subframe #2, a relay station receives uplink data from mobile stations. At step S820, in an uplink subframe #3, the relay station relays the uplink data to the base station. At step S830, in an uplink subframe #4 (i.e., a swapped subframe), the relay station receives uplink data from the mobile stations and downlink data from the base station.

Figure 16:
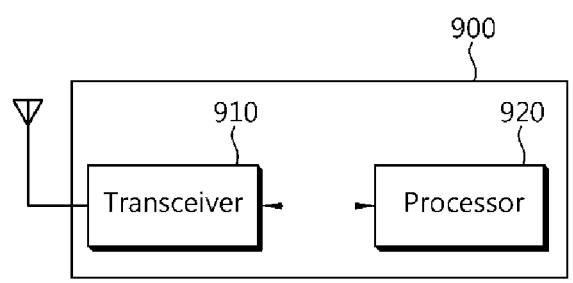
FIG. 16 is a block diagram of a relay station according to an embodiment of the present invention.

FIG. 16 is a block diagram of a relay station according to an embodiment of the present invention. A relay station 900 includes a transceiver 910 and a processor 920. The transceiver 910 receives data from a base station (or a mobile station) and also relays the data to a mobile station (or a base station). The processor 920 functions to process and relay data received from the transmitter/receiver 910. The above-described data relay method can be implemented by the processor 920.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module that performs the above-described functions. The software can be stored in a memory unit and executed by a processor. The memory unit or the processor can use various means that are well known to those skilled in the art.

Although some embodiments of the present invention have been described above, those having ordinary skill in the art will appreciate that the present invention may be modified in various forms without departing from the spirit and scope of the present invention defined in the appended claims. Accordingly, a possible change of the embodiments of the present invention may not deviate from the technology of the present invention.

What is claimed is:

1. A method of receiving signals, the method comprising:
receiving, by a wireless station from a base station, a first signal,
wherein the wireless station and the base station are configured to use at least one of a plurality of time division duplex (TDD) uplink-downlink (UL-DL) subframe configurations, each of which indicates locations of one or more TDD DL subframes and one or more TDD UL subframes in a radio frame,
wherein the radio frame comprises 10 subframes,
wherein the first signal includes first information indicating that at least one TDD UL subframe indicated by the at least one of the plurality of TDD UL-DL subframe configurations is reconfigured as at least one TDD DL subframe, and
wherein the at least one of the plurality of TDD UL-DL subframe configurations corresponds to one or more of configurations in Table 1 below, wherein 'D' denotes a DL subframe, 'U' denotes a UL subframe, and 'S' denotes a special subframe:

TABLE 1

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D; | receiving, by the wireless station from the base station, DL data on a subframe which was indicated as a TDD UL subframe by the at least one TDD UL-DL subframe configuration but is currently reconfigured as the TDD DL subframe by the first signal,
wherein the subframe, which was indicated as the TDD UL subframe by the at least one of the plurality of TDD UL-DL subframe configurations, but is currently reconfigured as the at least one TDD DL subframe, is not allowed for other wireless devices to perform a transmission; and
transmitting, by the wireless station to the base station, UL data on a TDD UL subframe except for being reconfigured as the TDD DL subframe by the first signal.

2. The method of claim 1, wherein the first signal corresponds to at least one of a physical layer signal and a radio resource control (RRC) signal.

3. The method of claim 1, wherein the first signal allows only at least one UL subframe among the one or more UL subframes and the one or more DL subframes, indicated by the at least one TDD UL-DL configuration to be reconfigured as the DL subframe.

4. The method of claim 1, wherein the one or more UL subframes except for the one or more DL subframes indicated by the at least one TDD UL-DL configuration are reconfigured as the DL subframe.

5. The method of claim 1, wherein the one or more DL subframes indicated by the at least one TDD UL-DL configuration are impossible to be reconfigured by the first signal.

6. The method of claim 1, further comprising:
receiving a second signal including second information indicating a TDD UL subframe, which is not allowed for the other wireless devices to perform the transmission.

7. A method of transmitting signals, the method comprising:
transmitting, from a base station to a wireless station, a first signal,
wherein the base station and the wireless station are configured to use at least one of a plurality of time division duplex (TDD) uplink-downlink (UL-DL) subframe configurations, each of which indicates locations of one or more TDD DL subframes and one or more TDD UL frames in a radio frame,
wherein the radio frame comprises 10 subframes,
wherein the first signal includes first information indicating that at least one TDD UL subframe indicated by the at least one of the plurality of TDD UL-DL subframe configurations is reconfigured as at least one TDD DL subframe, and
wherein the at least one of the plurality of TDD UL-DL subframe configurations corresponds to one or more of configurations in Table 1 below, wherein 'D' denotes a DL subframe, 'U' denotes a UL subframe, and 'S' denotes a special subframe:

TABLE 1

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D; | transmitting, from the base station to the wireless station, DL data on a subframe which was indicated as a TDD UL subframe by the at least one TDD UL-DL subframe configuration but is currently reconfigured as the TDD DL subframe by the first signal,
wherein the subframe, which was indicated as the TDD UL subframe by the at least one of the plurality of TDD UL-DL subframe configurations, but is currently reconfigured as the at least one TDD DL subframe, is not allowed for other wireless devices to perform a transmission; and
receiving, by the base station from the wireless station, UL data on a TDD UL subframe except for being reconfigured as the TDD DL subframe by the first signal.

8. The method of claim 7, wherein the first signal corresponds to at least one of a physical layer signal and a radio resource control (RRC) signal.

9. A wireless station for receiving signals, the wireless station comprising:
a transceiver; and
a processor configured to control the transceiver to:
receive, from a base station, a first signal,
wherein the base station and the wireless station are configured to use at least one of a plurality of time division duplex (TDD) uplink-downlink (UL-DL) subframe configurations, each of which indicates locations of one or more TDD DL subframes and one or more TDD UL subframes in a radio frame,
wherein the radio frame comprises 10 subframes,
wherein the first signal includes first information indicating that at least one TDD UL subframe indicated by the at least one TDD UL-DL subframe configuration is reconfigured as at least one TDD DL subframe, and
wherein the at least one of the plurality of TDD UL-DL subframe configurations corresponds to one or more of configurations in Table 1 below, wherein 'D' denotes a DL subframe, 'U' denotes a UL subframe, and 'S' denotes a special subframe:

TABLE 1

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D; | receive, from the base station, DL data on a subframe which was indicated as a TDD UL subframe by the at least one TDD UL-DL subframe configuration but is currently reconfigured as the TDD DL subframe by the first signal,
wherein the subframe, which was indicated as the TDD UL subframe by the at least one of the plurality of TDD UL-DL subframe configurations, but is currently reconfigured as the at least one TDD DL subframe, is not allowed for other wireless devices to perform a transmission; and
transmit, to the base station, UL data on a TDD UL subframe except for being reconfigured as the TDD DL subframe by the first signal.

10. The wireless station of claim 9, wherein the first signal corresponds to at least one of a physical layer signal and a radio resource control (RRC) signal.

* * * * *